United States Patent [19]
Hesse

[11] Patent Number: 5,345,064
[45] Date of Patent: Sep. 6, 1994

[54] TEMPERATURE PROBE CONDITIONER CIRCUIT

[75] Inventor: Gary L. Hesse, Buffalo Grove, Ill.

[73] Assignee: Appliance Control Technology, Inc., Addison, Ill.

[21] Appl. No.: 941,703

[22] Filed: Sep. 8, 1992

[51] Int. Cl.$^5$ .............................................. H05B 1/02
[52] U.S. Cl. .................................. 219/505; 219/413; 219/501; 219/497; 219/506; 374/1; 374/172
[58] Field of Search ............... 219/412, 413, 497, 501, 219/505, 504, 506, 241; 374/1, 172, 182, 164, 181

[56] References Cited

U.S. PATENT DOCUMENTS

| | | | |
|---|---|---|---|
| 4,072,051 | 2/1978 | Peterson | 73/194 |
| 4,237,900 | 12/1980 | Schulman et al. | 128/630 |
| 4,475,823 | 10/1984 | Stone | 374/1 |
| 4,532,809 | 8/1985 | Antonazzi et al. | 73/701 |
| 4,612,537 | 9/1986 | Maltais et al. | 340/596 |
| 4,615,014 | 9/1986 | Gigandet et al. | 364/557 |
| 4,638,850 | 1/1987 | Newell, III et al. | 236/78 R |
| 4,891,497 | 1/1990 | Yoshimura | 219/241 |
| 4,901,006 | 2/1990 | Harrison et al. | 324/106 |

*Primary Examiner*—Mark H. Paschall
*Attorney, Agent, or Firm*—Robert J. Black

[57] ABSTRACT

A temperature probe conditioner, while developing a voltage output proportional to probe temperature, generates a verify and a calibration output. A verify output to check the correctness of the conditioner's output voltage and a calibration output to confirm the range of the conditioner as well as to calibrate the port of an external circuit. These signals are connected to a microprocessor or similar device which makes decisions on whether to turn cooking elements "on" or "off" or to stop due to detected errors.

8 Claims, 1 Drawing Sheet

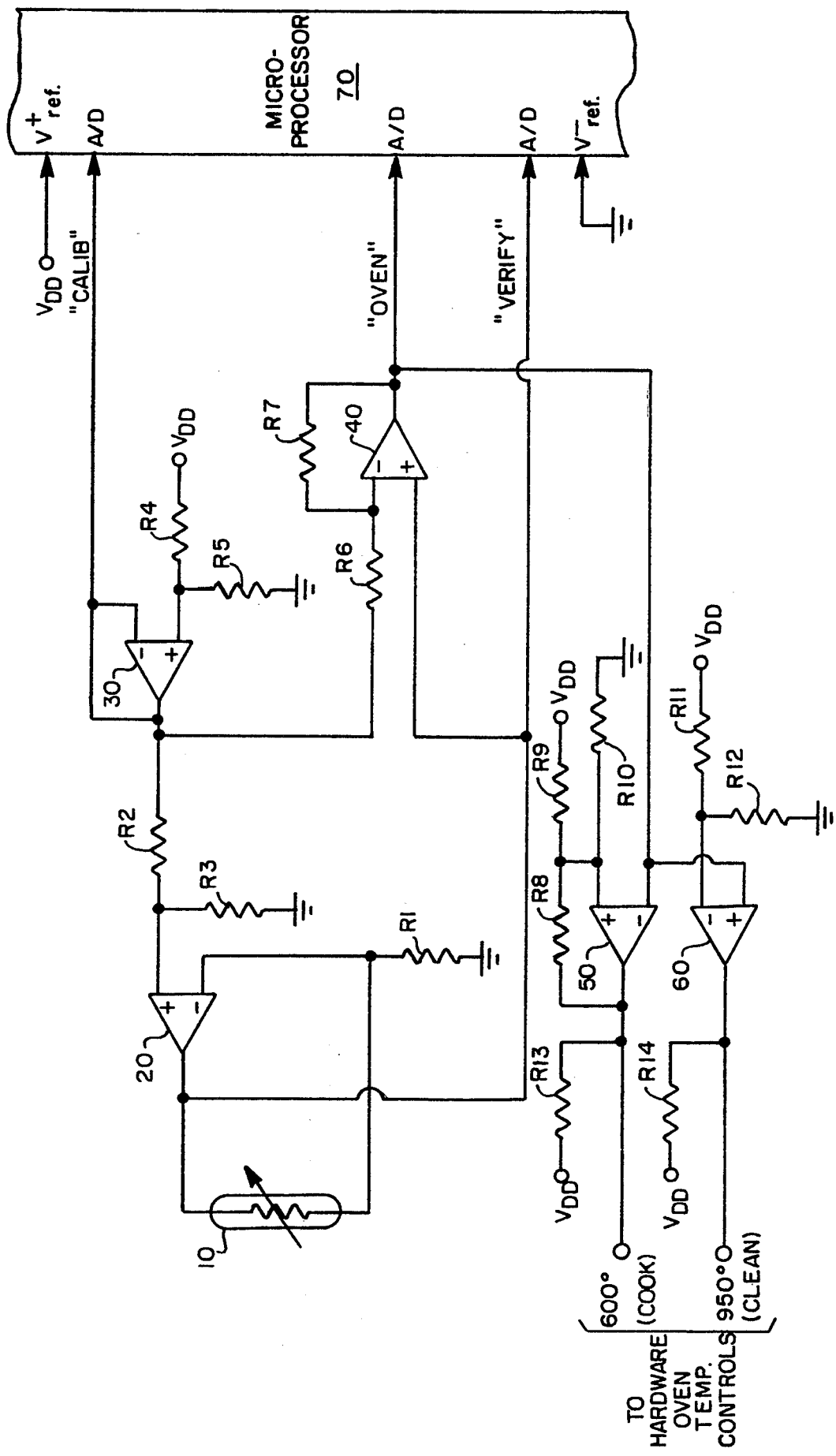

TEMPERATURE PROBE CONDITIONER CIRCUIT

BACKGROUND OF THE INVENTION

1. Field of the Invention

The present invention relates to temperature probes and more particularly to circuitry for conditioning an oven temperature probe.

2. Background Art

A search of the background art directed to the subject matter of the present invention conducted in the U.S. Patent and Trademark Office disclosed the following U.S. Letters Patent:

| | | |
|---|---|---|
| 3,699,800 | 3,924,101 | 4,546,320 |
| 4,736,091 | 4,761,539 | 4,852,544 |
| 4,906,820 | 4,958,062 | 5,029,244 |

Additional patents known to the applicant of the present invention include the following:

| | | |
|---|---|---|
| 4,345,145 | 4,393,300 | 4,467,184 |
| 4,782,215 | 4,829,161 | 4,899,034 |

None of the above identified patents are believed to claim, teach or disclose the novel combination of elements and function set forth in the present invention.

The intent of the present circuitry is to provide an economical means of converting a temperature variable resistance measurement of voltage over a complete range as required by most voltage converting circuits (analog to digital converters). Some of the circuits used in the past have included a capacitor charge time measurement wherein the probe is utilized as part of an RC timing network. This is particular technique, while inexpensive, highly inaccurate. Another technique incorporated pulse width modulation. While such techniques are simple, they are not very accurate and develop substantial problems at low voltages. Another approach has been to utilize a programmable resistor network to accurately vary the gain of an operational amplifier whose output is fed into a comparator. In such an arrangement, the comparator output then signals a microprocessor and a comparison between the probe voltage and that of the operational amplifier is made. Such an arrangement is quite accurate but requires a custom resistor network and several microprocessor outputs.

SUMMARY OF THE INVENTION

At the present time, many schemes are utilized to convert a temperature variable resistance such as may be detected by a thermistor or a resistance temperature device, to an output voltage that can be processed by a microcontroller or similar device. The reliability or accuracy of such conversion devices are always highly questionable.

To overcome such problems, the circuitry of the present invention develops an output proportional to the probe temperature and also contains two additional outputs. These include a verification output and a calibration output. The verification output is used to check the correctness of the conditioner's output voltage, i.e., the temperature reading. The calibration output, a precision voltage, is utilized to confirm the range of the conditioner as well as to calibrate the port of an external circuit, such as an analog to digital input, a microprocessor or similar device. The device, such as the microprocessor, interfacing to the conditioner of the present circuit will make decisions on whether to turn the cooking elements in the case of an oven or stove on or off or to stop due to measured errors. The conditioner circuit of the present invention utilizes general purpose qued operational amplifiers and resistors and as a consequence because of the simplified utilization of components is very economical. It also is ratio-metric providing an output that varies directly with the supply voltage. Thus the positive reference voltage on an analog to digital converter can be directly tied to the basic voltage source, eliminating the need for a stable reference voltage. Depending upon the precision desired, accuracy can be increased by using precision resistors since any inaccuracy present from the operational amplifiers has only minimal effect on the conditioners accuracy.

BRIEF DESCRIPTION OF THE DRAWINGS

A better understanding of the present invention may be had from a consideration of the following detailed description taken in conjunction with the accompanying drawings in which:

FIG. 1 is a schematic circuit diagram of a temperature probe conditioner for use with a cooking oven or similar apparatus in accordance with the present invention.

DESCRIPTION OF THE PREFERRED EMBODIMENT

Referring now to FIG. 1, the temperature probe conditioner of the present invention consists of circuitry receiving input from an associated oven probe 10 which would most typically be a resistance temperature device providing a number of outputs to an associated microprocessor 70 or similar device. It should be noted that the details of the microprocessor have not been shown inasmuch as this device is well known the art and the details do not form a portion of the present invention. It is only required that the microprocessor accept signals from the temperature probe conditioner of the present invention and act on them in a manner required to control an associated cook element, such as an oven.

It should also be noted that there are a pair of additional outputs (cook and clean) which provide runaway safety references to hardware backup circuits included with oven heating elements and ovens that are well known. Such elements may be turned off by the backup circuits, in the event of software or similar failure of the microprocessor which normally would control such turnoffs.

The details of the hardware associated with the oven control as backup circuitry has not been shown inasmuch as they are also well known in the art, it only being required that they function to turn off the associated heating elements in response to receipt of either the cook or clean "oven" temperature signals from the circuitry of the present invention.

The probe conditioner of the present invention utilizes three operational amplifiers to generate signals that can be used by a microprocessor or similar converting device having analog to digital inputs. The signals are the "calibrate" signal, the "verify" signal, and the "oven" signals as may be seen in FIG. 1. A constant current is developed for the oven probe 10 which is a variable resistor exhibiting a variation in its resistance qualities based on the temperature sensed. The constant current developed by amplifier 20 in combination with resistor R1 which is of the precision type having an accuracy of 0.1 percent. The gain resistor is provided by the oven probe 10. The "verify" signal at the output of operational amplifier 20 is referred to as the "verify" signal and is conducted directly to one of the analog to digital inputs of the microprocessor 70. This voltage signal varies linearly with the probe resistance and is converted by the microprocessor or similar conversion device to "verify" the oven temperature reading. The current sources voltage setting is determined by a precision resistor divider network using 0.1 percent resistors R2 and R3 as well as the calibration voltage from operational amplifier 30.

The calibration voltage at the output of amplifier 30 is determined by precision resistors R4 and R5, both of which have a 0.25 percent rating. This voltage is utilized by the microprocessor to "calibrate" its analog to digital ports. In this manner it is able to determine how far off from the expected reading its analog to digital inputs really are and may thus add or subtract this offset from the actual reading. The "calibrate" signal is also used to bias amplifier 40 at its inverting input. The gain of differential amplifier 40 is determined by resistors R6 and R7. Differential amplifier 40 amplifies the difference between the "calibrate" signal from amplifier 30 on its inverting input and the "verify" signal on the non-inverting or positive input. In this manner, operational amplifier 40 develops the "oven" signal. It is also applied to one of the analog to digital inputs of microprocessor 70. The "oven" signal is the voltage representation of the variable resistance exhibited by probe 10.

The same oven output signal is applied to the negative input of operational amplifier 50 which functions as a comparator which is biased so as to prevent an output signal to oven temperature backup hardware for temperatures over approximately 600 degrees Fahrenheit. Thus, if the cooking temperature exceeds that amount, the oven will be shut off if the microprocessor 70 has not already taken such action.

Similarly, the oven output signal is applied to the negative input of comparator 60 which is so biased that if the input signal exceeds, during the oven cleaning mode, 950 degrees Fahrenheit, an output signal will be transferred to the backup hardware associated with the oven to render it inoperable unless the microprocessor 70 has already caused it to be turned off. It should be noted that the supply voltage ($V_{dd}$) also acts as a voltage reference to the microprocessor 70, thus the outputs developed in the present ratio-metric system vary directly with that supply voltage. In this manner, the need for a separate stable reference voltage for the microprocessor 70 is eliminated.

The three signals developed by the present probe conditioner, the "calibrate" signal, the "verify" signal and the "oven" signal provide three, two and one function, respectively, to provide the check and balance interaction needed in a simple but accurate and reliable probe conditioner circuit. However, the oven signal circuit also is utilized to provide additional safety inputs to hardware associated with the elements of an oven in case of microprocessor or similar device failure.

While but a single embodiment of the present invention has been shown, it will be obvious to those skilled in the art that numerous modifications may be made without departing from the spirit of the present invention which should be limited only by the scope of the claims appended hereto.

What is claimed is:

1. A temperature probe conditioner circuit connected between a temperature sensitive probe comprising a variable resistor operated to different resistance values in response to the presence different temperatures and a signal processor comprising a microprocessor connected to a source of reference voltage and including analog to digital inputs connected to receive a calibrate signal, to receive a verify signal and to receive an oven signal, said conditioner comprising:

a first operational amplifier connected to said source of reference voltage, and including output circuit connections to said signal processor, to a second operational amplifier and to a third operational amplifier;

said first operational amplifier operated to generate said calibrate signal;

said second operational amplifier including circuit output connections to said probe, to said signal processor and to said third operational amplifier, said second operational amplifier operated in response to said calibrate signal to generate said verify signal;

said third operational amplifier including an output circuit connection to said signal processor, operated in response to said calibrate signal and said verify signal to generate said oven signal.

2. A temperature probe conditioner circuit as claimed in claim 1 wherein:

there is further included a fourth operational amplifier including an input connection to a second reference voltage source and an input connection from said third operational amplifier output, including an output circuit connection to s cooking element control means, said fourth operational amplifier operated in response to said oven signal to generate an operate signal to said cooking element control means in response to an oven signal greater than a predetermined value determined by said second reference voltage source.

3. A temperature probe conditioner circuit as claimed in claim 1 wherein:

there is further included a fifth operational amplifier circuit including an input circuit connected to said third operational amplifier output and an input circuit connected to a third source of reference voltage, said fifth operational amplifier further including an output circuit to a cleaning element control means, said fifth operational amplifier operated in response to said oven signal in excess of a predetermined value determined by said third reference voltage means to generate an operate signal to said cleaning element said means.

4. A temperature probe conditioner as claimed in claim 1 wherein:

said second operational amplifier operates as a constant current source for said temperature sensitive probe;

the voltage setting for said second operational amplifier determined by a precision resistor divider network consisting of first and second resistors.

5. A temperature probe conditioner as claimed claim 1 wherein:

a calibration voltage for said second operational amplifier is determined by third and fourth precision resistors connected to an input of said second operational amplifier.

6. A temperature probe conditioner as claimed in claim 1 wherein:
the gain of said third operational amplifier is determined by fifth and sixth resistors;
said third operational amplifier amplifying the difference between said calibrate signal on said first input and the verify signal on a second input, to generate the oven signal.

7. A temperature probe conditioner circuit as claimed in claim 2 wherein:
said reference voltage for said fourth operational amplifier is determined by seventh and eighth resistors.

8. A temperature probe conditioner circuit as claimed in claim 3 wherein:
said reference voltage for said fifth operational amplifier is determined by ninth and tenth resistors.

* * * * *